United States Patent
Wagner

(10) Patent No.: US 11,146,963 B2
(45) Date of Patent: Oct. 12, 2021

(54) SYSTEM AND METHOD FOR LOCATION DETERMINATION USING MESH ROUTING

(71) Applicant: Visa International Service Association, San Francisco, CA (US)

(72) Inventor: Kim R. Wagner, Sunnyvale, CA (US)

(73) Assignee: Visa International Service Association, San Francisco, CA (US)

( * ) Notice: Subject to any disclaimer, the term of this patent is extended or adjusted under 35 U.S.C. 154(b) by 852 days.

(21) Appl. No.: 15/889,925

(22) PCT Filed: Aug. 15, 2016

(86) PCT No.: PCT/US2016/047102
§ 371 (c)(1),
(2) Date: Feb. 6, 2018

(87) PCT Pub. No.: WO2017/031087
PCT Pub. Date: Feb. 23, 2017

(65) Prior Publication Data
US 2020/0169874 A1 May 28, 2020

Related U.S. Application Data

(60) Provisional application No. 62/205,531, filed on Aug. 14, 2015.

(51) Int. Cl.
| | |
|---|---|
| *H04W 12/63* | (2021.01) |
| *H04W 4/029* | (2018.01) |
| *G06Q 20/32* | (2012.01) |
| *H04W 12/06* | (2021.01) |
| *H04W 12/08* | (2021.01) |
| *H04W 64/00* | (2009.01) |
| *H04W 84/18* | (2009.01) |

(52) U.S. Cl.
CPC ........ *H04W 12/63* (2021.01); *G06Q 20/3224* (2013.01); *H04W 4/029* (2018.02);
(Continued)

(58) Field of Classification Search
CPC .......... G06Q 20/1085; G06Q 20/3223; G06Q 20/3224; G06Q 20/3278; G06Q 20/18;
(Continued)

(56) References Cited

U.S. PATENT DOCUMENTS

| | | | |
|---|---|---|---|
| 9,767,474 B1 * | 9/2017 | Ramalingam | ...... G06Q 30/0601 |
| 2010/0022254 A1 | 1/2010 | Ashfield | |

(Continued)

FOREIGN PATENT DOCUMENTS

| | | |
|---|---|---|
| CN | 102687165 | 9/2012 |
| GB | 2492614 A | 1/2013 |

OTHER PUBLICATIONS

International Search Report and Written Opinion, dated Nov. 17, 2016, in PCT Application No. PCT/US2016/047102, 13 pages.

(Continued)

*Primary Examiner* — Kwasi Karikari
(74) *Attorney, Agent, or Firm* — Kilpatrick Townnsend & Stockton LLP

(57) ABSTRACT

Embodiments of the invention relate to determining a mobile communication device's location, even if the mobile communication device does not have an active data connection. Embodiments of the invention also relate to achieving connectivity between a mobile communication device not having an active data connection and to another mobile communication device, server computer, or third-party computer.

20 Claims, 7 Drawing Sheets

(52) U.S. Cl.
CPC .......... *H04W 12/06* (2013.01); *H04W 12/08* (2013.01); *H04W 64/003* (2013.01); *H04W 84/18* (2013.01)

(58) Field of Classification Search
CPC .......... G06Q 20/4012; G06Q 20/4014; G06Q 20/401; G06Q 20/3276; G06Q 20/385; G06Q 20/40; G06Q 20/20; G06Q 30/0261; G06Q 20/08; G06Q 20/105; G06Q 20/32; G06Q 20/322; G06Q 20/3226; G06Q 20/326; G06Q 20/34; G06Q 20/352; G06Q 20/384; G06Q 20/409; G06Q 30/0259; G06Q 30/0267; G06Q 20/102; G06Q 20/4015; G06Q 20/4097; H04W 12/06; H04W 12/0608; H04W 4/80; H04W 4/023; H04W 4/70; H04W 12/00503; H04W 88/02; H04W 12/00508; H04W 12/0605; H04W 4/02; H04W 12/1202; H04W 4/021; H04W 92/18

See application file for complete search history.

(56) References Cited

U.S. PATENT DOCUMENTS

| | | |
|---|---|---|
| 2011/0137804 A1 | 6/2011 | Peterson |
| 2011/0202460 A1 | 8/2011 | Buer et al. |
| 2013/0034020 A1* | 2/2013 | Morgan .............. H04W 84/14 370/255 |
| 2013/0046692 A1* | 2/2013 | Grigg ............... G06Q 20/4016 705/44 |
| 2014/0040129 A1* | 2/2014 | Akin ................... G06Q 20/32 705/44 |
| 2014/0045529 A1 | 2/2014 | Bolon et al. |
| 2014/0250009 A1 | 9/2014 | Carlson |
| 2015/0019443 A1 | 1/2015 | Sheets et al. |
| 2015/0058125 A1 | 2/2015 | Moshfeghi |
| 2015/0186891 A1 | 7/2015 | Wagner et al. |

OTHER PUBLICATIONS

Oziel Hernandez, et al., "Position Location Monitoring," Beyond Bits, Issue 4, pp. 67-73, Jun. 2009, 7 pages.
Helen Cheung, et al., "A Secure Electronic Payment Protocol for Wireless Mesh Networks," International Journal of Network Security & Its Applications (IJNSA), vol. 6, No. 5, Sep. 2014, 22 pages.
Rui Huang, et al, "Location tracking in mobile ad hoc networks using particle filters," Journal of Discrete Algorithms, vol. 5, Issue 3, pp. 455-470, Sep. 2007, 16 pages.
AU2016308096 , "First Examination Report", dated Jan. 17, 2020, 4 pages.
CN201680056267.X , "Office Action", dated Jan. 2, 2020, 20 pages.
Extended European Search Report, dated Feb. 5, 2019, in EP Application No. 16836676.2, 12 pages.

* cited by examiner

SYSTEM AND METHOD FOR LOCATION DETERMINATION USING MESH ROUTING

CROSS REFERENCE TO RELATED APPLICATIONS

This application is a National Stage of International Application No. PCT/US2016/047102 filed Aug. 15, 2016, and which claims the benefit of the filing date of U.S. Provisional Application No. 62/205,531, filed on Aug. 14, 2015, which are all herein incorporated by reference in their entireties for all purposes.

BACKGROUND

Many mobile applications require the ability to determine a location of the mobile device. Often times, the determined location must be relayed to a server computer or another device. However, a mobile device may not have an active data connection for a vast number of reasons. This may prevent the mobile application from relaying its determined location to the server computer or other device and prevent proper functionality of the mobile application. For example, many mobile applications may not allow certain actions to complete without first verifying the location of the mobile device (e.g., fraud prevention).

Current solutions may simply notify a user of the mobile device that an active data connection is not present and require that the user try again.

Embodiments of the invention address these and other problems individually and collectively.

SUMMARY

One embodiment of the invention is directed to a method. The method comprises receiving, by a server computer from an access device at geographic location, an authorization request message comprising transaction data for a transaction conducted by a user using a portable device operating a first mobile communication device. The method further comprises receiving, by the server computer, first mobile communication device data from the first mobile communication device via a second mobile communication device operated by a second user at the geographic location. The method further comprises determining, by the server computer, first location data of the mobile communication device using the first mobile communication device data. The method further comprises determining, by the server computer, second location data from the transaction data in the authorization request message. The method further comprises determining, by the server computer, if the first location data and the second location data are within a predetermined distance. The method further comprises allowing, by the server computer, the transaction to proceed when the first location data and the second location data are within the predetermined distance.

Another embodiment of the invention is directed to a server computer configured to perform the above-described method.

Another embodiment of the invention is directed to a method comprising transmitting, by a first mobile communication device operated by a first user, first mobile communication device data to a remote server computer via a second mobile communication device operated by a second user, wherein the remote server computer (i) receives from an access device at geographic location, an authorization request message comprising transaction data for a transaction conducted by a user using a portable device operating a first mobile communication device, (ii) receives the first mobile communication device data from the first mobile communication device via a second mobile communication device operated by a second user at the geographic location, (iii) determines first location data of the mobile communication device using the first mobile communication device data, (iv) determines second location data from the transaction data in the authorization request message, (v) determines if the first location data and the second location data are within a predetermined distance; (vi) allows the transaction to proceed when the first location data and the second location data are within the predetermined distance The method further comprises receiving, by the first mobile communication device, a transaction alert message from the server computer indicating that the transaction was authorized.

Another embodiment of the invention is directed to a mobile phone configured to perform the above-described method.

Further details regarding embodiments of the invention can be found in the Detailed Description and the Figures.

DETAILED DESCRIPTION

Figure 1:
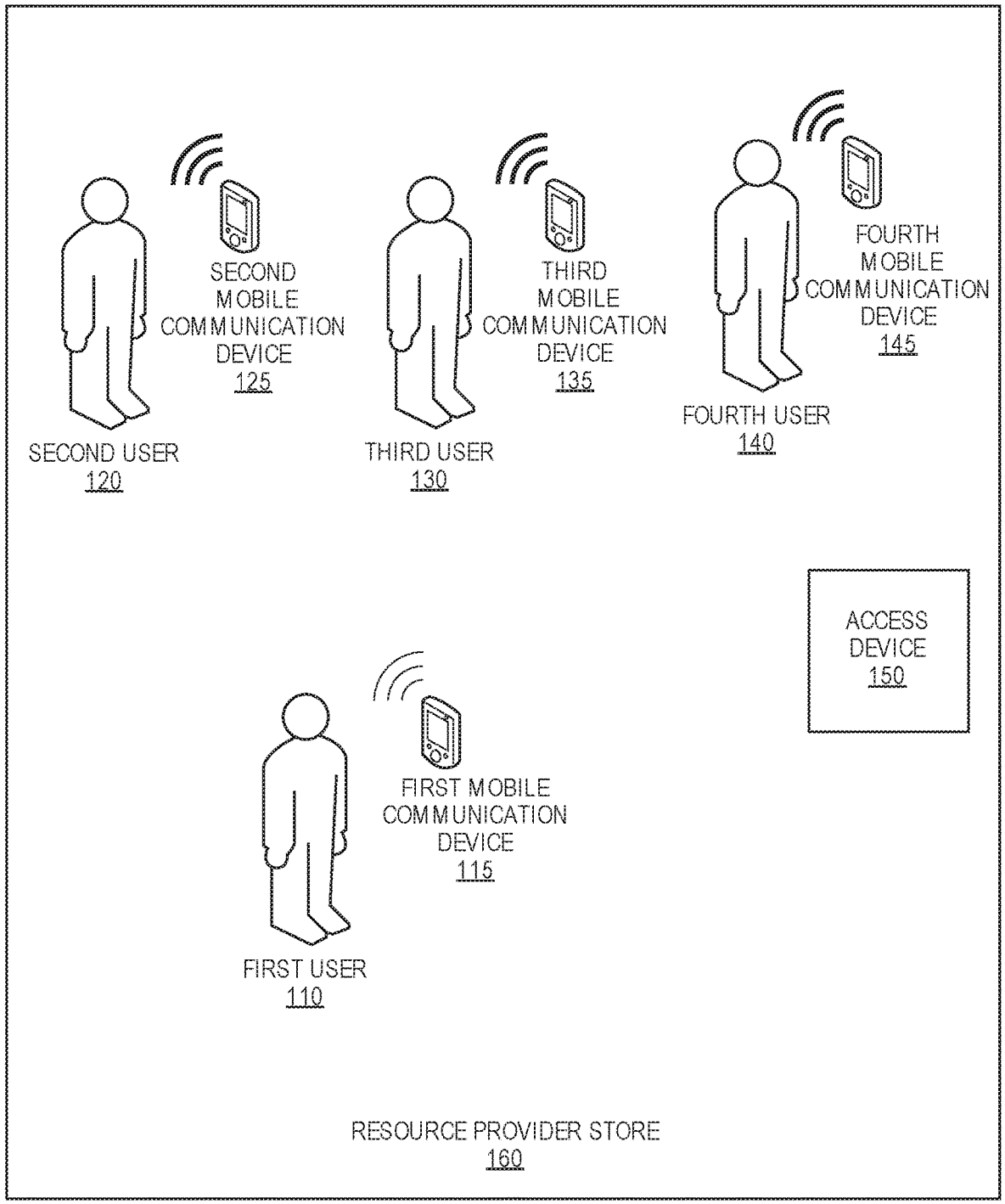
FIG. 1 illustrates a first mobile communication device not having an active data connection within a resource provider store, according to embodiments of the invention.

Embodiments of the invention relate to determining a mobile communication device's location, even if the mobile communication device does not have an active data connection. Embodiments of the invention also relate to achieving connectivity between a mobile communication device not having an active data connection and to another mobile communication device, server computer, or third-party computer. Embodiments of the invention further relate to measuring a Received Signal Strength Indicator (RSSI) to estimate relative positions of all nodes (e.g., other mobile communication devices) within a vicinity of a mobile communication device. Embodiments of the invention may carried out in the context of transactions.

Embodiments of the invention have a number of advantages. For example, certain mobile payment solutions (e.g., Apple Pay™) that run on mobile communication devices use tokens that are provisioned for storage on the mobile communication device at a time distinct from the time that a payment transaction actually occurs. Thus, even if the mobile communication device does not have an active data connection (e.g., 3G, LTE, 4G, Wi-Fi, etc.) at the time of the payment transaction, the mobile payment system can still use the token stored in the mobile communication device (e.g., stored within a secure element on the mobile communication device). Transaction security can be maintained by having the token and associated cryptographic material carried out while the mobile communication device is online (e.g., has an active data connection). However, certain security functions, such as provisioning can only be carried out while the mobile communication device is online. If the user of the mobile communication device is roaming in an area without an active data connection, mesh networking may provide online capability for the mobile communication device where there otherwise would be no connectivity. Thus, provisioning of the mobile communication device can be enabled along with functionality for the user to complete a payment transaction using the mobile communication device, where the user otherwise would be unable to due to the mobile communication device not having an active data connection.

In another example, many mobile payment solutions incorporate cloud-based payment where no secure element exists on the mobile communication device. In this case, given that there is no secure element, security exposure is contained by using limited-use keys, code obfuscation, and other related techniques. These techniques seek to mitigate the fact secure payment data elements are stored in software on the mobile communication device. However, the limited use keys may only be updated when the mobile communication device is online (e.g., the mobile communication device has an active data connection). Accordingly, many situations may occur when a user's mobile communication device does not have an activate data connection, for a number of reasons. In such cases, the mobile communication device may not be able to successfully update the limited use keys prior to participating in a mobile payment transaction. Embodiments of the invention may leverage active data connections of other mobile communication device in a mesh network to provide connectivity to the mobile communication device for updating the limited use keys.

In yet another example, according to the Fast Identity Online (FIDO) alliance, the main mode of operation for a mobile payment transaction is where a relying third-party requests authentication (e.g., biometric authentication) from the consumer and the consumer device performs the authentication and communicates a result to the relying third-party. The relying third-party can be a remote server (e.g., associated with an online merchant's website, or with an issuer). However, this mode of operation will fail when the mobile communication device does not have an active data connection to communicate with the relying third-party.

In a further example, a user could be travelling with his/her mobile communication device. The issuer for the payment account associated with the user can have implemented security measures that only work when the user's mobile communication device has an active data connection. Such security measures can include sending and receiving One-Time Passwords (OTPs) over short messaging service (SMS), employing device fingerprinting, or employing biometric authentication for step-up authentication. Without an active data connection, these security measures would not be able to successfully authenticate the consumer.

In yet another example, a payment application can use location-based risk scoring, taking input both from the user mobile communication device and the merchant location. Such a service may require the transmission of the mobile communication device's location back to the party providing the service. Without an active data connection between the mobile communication device and the third-party providing the service, the system would be unable to determine a location-based risk score.

In yet another example, a document management application can execute on a user's mobile communication device. A user may wish to access or one more secure documents stored on a document management server. Prior to allowing access to the secure documents, the document management server may require that the user be in a particular location. For example, a user may only be able to access sensitive medical documents at a hospital or care provider location. If the user's mobile communication device does not have an active data connection, mesh networking may provide online capability for the mobile communication device where there otherwise would be no connectivity.

Similarly, access to a building may also be based on a location of a mobile communication device. For example, granting access to a building may be dependent on a location of the user's mobile communication device. If the user's mobile communication device does not have an active data connection, mesh networking may provide online capability for the mobile communication device where there otherwise would be no connectivity.

As can be seen by way of the examples described above, each of the use cases in the examples could be improved by providing the mobile communication device with data connectivity (e.g., an active data connection) or, in some cases, by using other mobile communication device within a mesh network located within a vicinity of the mobile communication device to confirm location information of the consumer device. The mesh network technology can be controlled by an application running on the mobile communication device (and other mobile communication devices). The application can be downloaded the mobile communication device via an online application store, or can function as part of the operating system. The user's mobile communication devices and any other communication devices (e.g., intermediary nodes) can run the same application on the respective devices. The application(s) may be configured to communicate with each other (via the different mobile communication devices) and provide support for creating a short range communication link between the devices in order to support these communications. For example, the user's mobile communication device and any other mobile communication devices can run a mobile payment application that supports mobile payments in addition to creating and maintaining a short range communication link between the devices for transmitting and receiving data between the devices.

The approaches above may provide many benefits. First and foremost, the intermediate nodes (e.g., other mobile communication devices in the vicinity having an active data connection) in the mesh network may can confirm the geo-location of the mobile communication device not having an active data connection and attempting to complete a purchase transaction. If a fraudster attempts to manipulate or "spoof" the location information of the mobile communication device, the other mobile communication devices in the mesh network would be able to contradict this spoofed location information. The trust model implemented in these embodiments is similar to a "web of trust," such as what is used Pretty Good Privacy (PGP), although temporary in nature and based on geographical proximity rather than personal acquaintance. In some embodiments, the other mobile communication devices in the vicinity of the mobile communication device can provide geo-location information of the mobile communication device even if the mobile communication device has an active data connection. This can be used a "secondary check" to ensure that the geo-location of the mobile communication device is not being spoofed in order to complete a fraudulent transaction or gain fraudulent access to data or a building.

Second, the approaches above may provide a better chance for the mobile communication device not having an active data connection to achieve connectivity back to the card issuer or other relying third-party.

Third, together with the other nodes (e.g., other mobile communication device within the vicinity having an active data connection), the mobile communication device may measure obtain an RSSI measurement to estimate the relative position of the other nodes in its vicinity, which may significantly increase the accuracy by which the location of the mobile communication device may be determined. In conjunction with payment use cases where the user may keep their user device in his/her pocket while walking through a merchant store and up to a payment terminal (e.g., access device), this approach may help disambiguate which user is in front of the checkout line and ready to pay, without requiring the consumer to pull out the mobile communication device from their pocket.

Prior to discussing specific embodiments of the invention, some terms may be described in detail.

A "mobile communication device" or "mobile device" may comprise any suitable electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "portable device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile communication device can function as a payment device (e.g., a mobile communication device can store and be able to transmit payment credentials for a transaction).

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, and any other suitable information.

An "application" may be computer code or other data stored on a computer readable medium (e.g. memory element or secure element) that may be executable by a processor to complete a task. Examples of an application include, but are not limited to, a mobile application, a mobile payment application, a secure document access application, or a secure building entry application.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card.

A "digital wallet provider" may include an entity, such as an issuing bank or third party service provider, that issues a digital wallet to a user that enables the user to conduct financial transactions. A digital wallet provider may provide standalone user-facing software applications that store account numbers, or representations of the account numbers (e.g., payment tokens), on behalf of a cardholder (or other user) to facilitate payments at more than one unrelated merchant, perform person-to-person payments, or load financial value into the digital wallet. A digital wallet provider may enable a user to access its account via a personal computer, mobile device or access device. Additionally, a digital wallet provider may also provide one or more of the following functions: storing multiple payment cards and other payment products on behalf of a user, storing other information including billing address, shipping addresses, and transaction history, initiating a transaction by one or more methods, such as providing a user name and password, NFC or a physical token, and may facilitate pass-through or two-step transactions.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenzation" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization may be used to enhance transaction efficiency, improve transaction security, increase service transparency, or to provide a method for third-party enablement.

A "token provider" or "token service system" can include a system that that services payment tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the token to obtain the actual PAN. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "user" may include an individual. In some embodiments, a user may be associated with one or more personal accounts and/or mobile devices. The user may also be referred to as a cardholder, account holder, or consumer.

A "resource provider" may be an entity that can provide a resource such as goods, services, information, and/or access. Examples of a resource provider includes merchants, access devices, secure data access points, etc. A "merchant" may typically be an entity that engages in transactions and can sell goods or services, or provide access to goods or services. A resource provider may provide the resource(s) at one or more "resource provider location(s)."

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

"Transaction data" can refer to any data that is pertinent to a transaction. For example, in the context of a payment transaction, transaction data can include, but is not limited to, geolocation, transaction amount, payment credentials, address, zip code, etc.

A "geographic location" can refer to a position on the Earth. It may relate to a specific area (a point and an area surrounding the point) or point on the Earth. The geographic location can be defined by at least two coordinates, longitude and latitude. These two coordinates can be used to give specific locations independent of an outside reference point. For example, a geographic location of a mobile communication device can be used to pinpoint the mobile communication device's precise location.

"Location data" comprises any data that can be used to determine a geographic location of a mobile communication device or any other device.

An "ad-hoc routing protocol" convention, or standard, that controls how nodes decide which way to route packets between computing devices in a mobile ad hoc network. In ad hoc networks, nodes are not familiar with the topology of their networks. A wireless ad hoc network is a decentralized type of wireless network. The network is ad hoc because it does not rely on a preexisting infrastructure, such as routers in wired networks or access points in managed (infrastructure) wireless networks.

FIG. 1 illustrates a first mobile communication device 115 not having an active data connection within a resource provider store 160, according to embodiments of the invention. A number of users (e.g., first user 110, second user 120, third user 130, and fourth user 140) are located within the resource provider store 160. Additionally, each user has an associated mobile communication device (e.g., first mobile communication device 115, second mobile communication device 125, third mobile communication device 135, and fourth mobile communication device 145). The resource provider store 160 may also include an access device 150. The resource provider store 160 can be a merchant store (e.g., a supermarket, gas station, etc.). User's may interact with the access device 150 by using portable device (e.g., a payment card) to initiate and execute a transaction.

As can be seen in the figure, the first mobile communication device 115 does not have an active data connection (indicated by thinner "signal bars"). The first mobile communication device 115 may not have an active data connection for any number of reasons. For example, the network provider associated with the first mobile communication device 115 may be experiencing an outage in the location surrounding the resource provider store 160.

The first user 110 may wish to conduct a transaction at the resource provider store 160 by interacting with the access device 150. In some embodiments, the access device 150 may be a POS terminal. The first user 110 may begin the transaction by interacting with the access device 150 using his/her portable device (not shown). For example, the first user 110 may swipe his/her credit card at the access device 150. The access device 150 may communicate transaction data to a server computer, the transaction data including details related to the transaction. The server computer may also expect location data from the first mobile communication device 115 or from one or more other mobile communication devices within a proximity of the first mobile communication device 115, the location data indicative of a geographic location of the first mobile communication device 115. The server computer may expect this data so that it can verify that the first user 110 is in fact at the resource provider store 160 and that the first user's 110 portable device is not being used fraudulently. This can be done by comparing location data from the first mobile communication device 115 or from one or more other mobile communication devices within a proximity of the first mobile communication device 115, with location data from the transaction data, and determining whether the two locations match. However, as mentioned earlier, the first mobile communication device 115 may not have an active data connection.

In another example, the first mobile communication device 115 may have location services (e.g., GPS) turned off or not functioning properly. In this case, the first mobile communication device 115 may be unable to produce its own location data. However, location data from one or more other mobile communication devices within a proximity of the first mobile communication device 115 may be able to provide its own location data.

In another example, the first mobile communication device 115 may have location services (e.g., GPS) turned off or not functioning properly and also not have an active data or network connection. In this case, an application running on the first mobile communication device 115 may realize that there is no GPS or data connectivity and create a wireless short range communication link with another mobile communication device. The other mobile communication device may be running the same application as the first mobile communication device 115. The respective applications running on the first mobile communication device 115 and the other mobile communication device may facilitate the communication link between the devices. In the context of the transaction, the other mobile communication device may provide its own location to a server computer in order for authentication of the transaction. The server computer may authenticate the transaction based at least in part on the received location from the other mobile communication device. For example, the server computer may compare the received location of the other mobile communication to a received location provided by an access device, to ensure that the two locations match. Since the first mobile communication device 115 is in close proximity to the other mobile communication device, the server computer may be confident that the location provided by the other mobile communication is similar to the actual location of the first mobile communication device 115.

A payment-related application (or the operating system itself) running on the first mobile communication device 115 may determine that an active data connection does not exist or location data is not available from the first mobile communication device 115. The application may then facilitate for the first mobile communication device 115 to connect to a another mobile communication device (e.g., second mobile communication device 125, third mobile communication device 135, or fourth mobile communication device 145) belonging to one of the other users within the resource provider store 160, where the other communication devices may have an active data connection (indicated by the bold signal strength lines). Further, the other mobile communication devices may be running the same payment-related application as the first mobile communication device 115. In some embodiments, the connection from the first mobile communication device 115 to the other mobile communication devices may take place near the entrance of the store. In other embodiments, the connection from the first mobile communication device 115 to the other mobile communication devices may take place prior to the first user 110 attempting to initiate a payment transaction using his/her portable device with the access device 150. For example, the first mobile communication device 115 may realize it does not have an active data connection, and establish a data connection via the second mobile communication device 125 upon the first user 110 entering the resource provider store 160. The data connection may be a short range communication link and the link may be established and maintained via the application(s) running on the respective mobile communication devices. In another example, the first mobile communication device 115 may realize it cannot provide its own location data (e.g., due to location services being disabled or malfunctioning), and establish a data connection to the second mobile communication device 125 in order to notify the second mobile communication device 125 of such. The second mobile communication device 125 may then provide its own location data to the server computer, and the server computer may use the received location data to infer the location of the first mobile communication device 115.

The first mobile communication device 115 and other mobile communication devices may be connected to each other via a mesh network. For example, when the first mobile communication device 115 approaches the entrance of the resource provider store 160, the first mobile communication device 115 may join a mesh network consisting of the other mobile communication devices (e.g., second mobile communication device 125, third mobile communication device 135, or fourth mobile communication device 145). Details of the implementation of the mesh network are described with respect to FIG. 2.

After the first mobile communication device 115 joins the mesh network with the other mobile communication devices, the location data of the first mobile communication device 115 can be transmitted to the server computer using the data connection established via the mesh network. In some embodiments, the geolocation of any of the other mobile communication devices be used to pinpoint the location of the first mobile communication device 115. In other words, since the first mobile communication device 115 does not have an active data connection, the location data provided by the first mobile communication device 115 can be "piggybacked" through another one or more mobile communication devices so that the location data can reach the server computer. In another embodiment, if the first mobile communication device 115 cannot reliably provide its location data, location data from one or more other mobile communication devices within a proximity of the first mobile communication device 115 can be used to approximately pinpoint the location of the first mobile communication device 115. The determined location can then be used in part to authenticate a payment transaction initiated by the first user 110 using his/her portable device. For example, an issuer or payment processor network associated with the transaction could employ a fraud engine to determine if the merchant location matched the location of the first mobile communication device 115 belonging to the first user 110. The matching can be used to proof that an authentic transaction is occurring, and that the location is not being spoofed by a fraudster. In some embodiments, the first user's 110 portable device can be simply be the first mobile communication device 115. In other words, the first user 110 may initiate the transaction using the first mobile communication device 115 and then the first mobile communication device 115 may provide its location data (via the mesh network) to the server computer.

Figure 2:
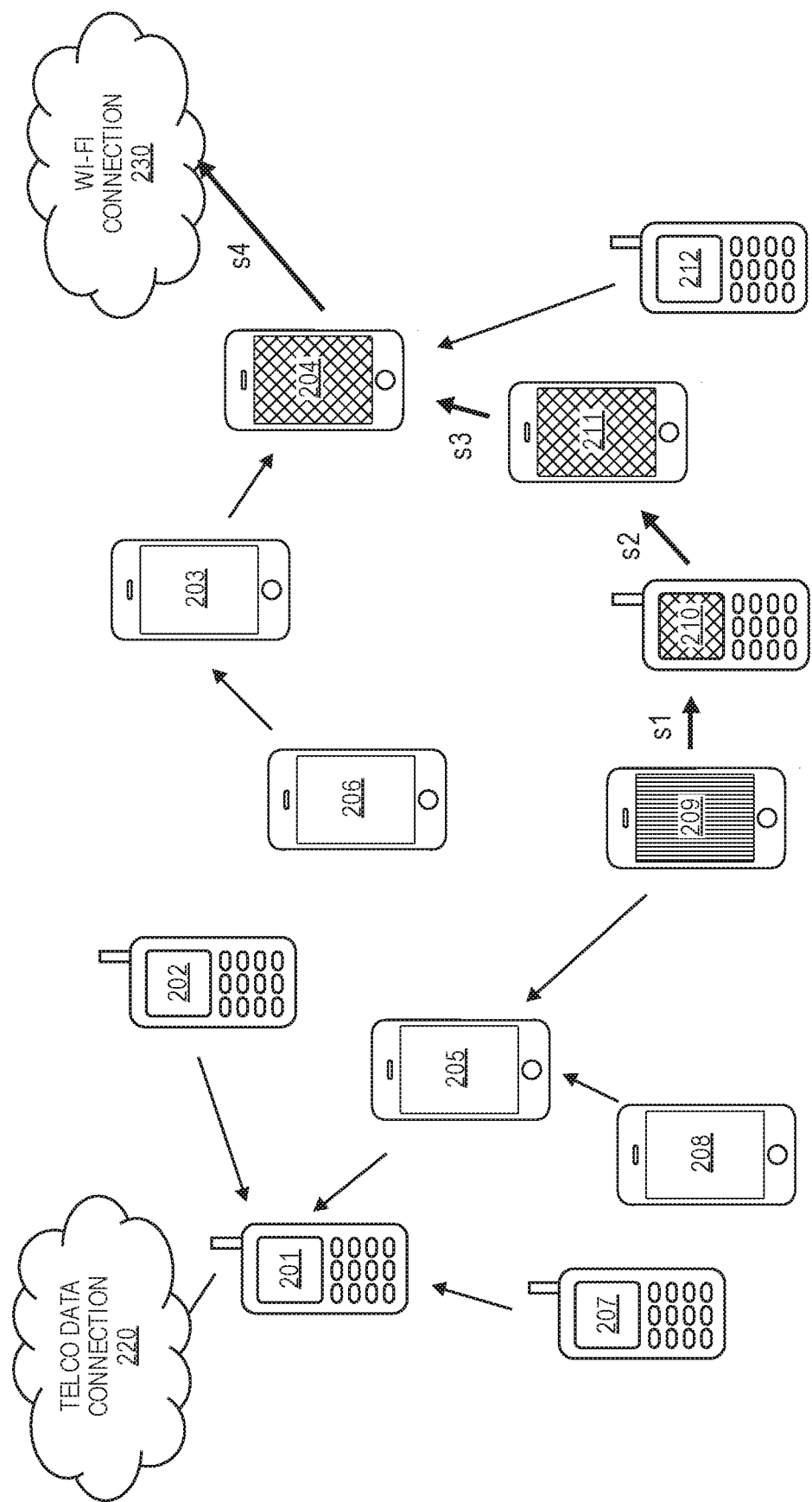
FIG. 2 illustrates a mesh network between several mobile communication devices, according to embodiments of the invention.

FIG. 2 illustrates a mesh network between several mobile communication devices, according to embodiments of the invention. In the figure, device 201 has a telco data connection, device number 204 has a Wi-Fi connection, while the rest of the devices 202, 203, 205, 206, 207, 208, 209, 210, 211, 212 have neither a data nor a Wi-Fi connection. It can be assumed that all the devices in the figure have a mesh payment application or setting running on the devices. In the figure, a user of device 209 may wish to initiate a transaction. However, as mentioned above, device 209 does not have an active data connection. The relevant device data transmitted from device 209 may travel via device 210, device 211, and device 204 before reaching a Wi-Fi connection (via device 204). From device number 204, the transaction can proceed as it normally would have, had device number 209 had a data or Wi-Fi connection directly.

The devices that do not have any data or Wi-Fi connection can communicate (e.g. using Bluetooth or Wi-Fi) with all the other devices via the mesh network. Mesh routing technology (e.g. Zone Routing Protocol (ZRP), Ad hoc On-Demand Distance Vector (AODV) routing, or other ad-hoc routing protocols) can allow the routing of messages from any of the devices through some of the other devices, through one of the devices with an external connection (e.g., device 201 or device 204) and on to the intended destination. At the exit point, where one of the devices has a telco or a Wi-Fi connection (e.g., device 201 or device 204, mesh routing ends and traditional (telephony or TCP/IP) routing takes over.

In other words, the intermediate devices (e.g., device 210, device 211, and device 204) may function as "conduits" for a device without an active data connection (e.g., device 209). As mentioned above, this approach can add value in two additional ways. The intermediate devices can provide their own geo-location information that can supplement location information provided by the consumer device and used by the issuer or third party for risk management. In particular if location information of the intermediary devices differs significantly from that of the consumer device, it may be an indication that the location information from the consumer device is forged. Additionally, the intermediary devices may engage in a protocol that estimates each device's geo-location with increased accuracy using received signal strength from the other nodes in the mesh, together with the location information from GPS on some of the same mesh nodes.

Since a mesh network is usually very limited in size before an exit node is found, the geo location of an intermediate node would be expected to be very close to the location of device 209 (e.g., the device initiating the transaction). This has the added benefit that even if device 209 does not have location services set, the approximate location of the transaction can still be determined. In this way, the whole community of mobile devices near the consumer can join to vouch for at least the approximate location of device 209.

If desired, various cryptographic techniques can be used to protect the integrity of the location indications from the intermediary nodes. For example, a Public Key Infrastructure (PKI) could be used such that the mesh payment application running on the devices uses encryption and PKI to avoid eavesdropping and Man-In-The-Middle (MITM) attacks. Due to the existence of consumer devices without a secure element, certificates can be made short lived to mitigate attacks on the private keys stored in the devices. However, in most cases, the security of the payment transaction may not rely on the trust in the communications channel, and therefore the introduction of intermediary nodes should not result in any increased risks: these nodes may simply contribute to the network and transport layer, just as the (untrusted) Internet.

Additionally, in order for a device to perform an online payment while it does not itself have online connectivity, it may need to communicate via a mesh routing protocol with other devices running a compatible application both at the communications layer and the application layer, so that the devices between the device initiating the transaction and the ultimate source of the transaction (e.g., the server computer) can understand and can act in the appropriate way as a conduit for the transaction, and can route those messages correctly. However, additional assurance from a security perspective may be had even from devices adjacent to the initiating device (e.g., device 209) which may not run a compatible application at the application layer and have no knowledge about the mesh transaction), but do have some kind of connectivity with the initiating device (e.g., a WiFi signal from a WiFi router, a Bluetooth Low Energy (BLE) announcement from another mobile device, infrared (IR), or mesh network connectivity from an Internet of Things (IoT) appliance that does not run the mesh transaction protocol.

Such adjacent devices which do not run the mesh payment application can nonetheless be expected to announce their Internet Protocol version 6 (IPv6) or other identifier (e.g., media access control (MAC) address, WiFi Service Set Identifier (SSID), BLE Universally Unique Identifier (UUID), to the initiating device. For example, a WiFi router may do this even if no WiFi connection is initiated. The initiating device (e.g., device 209) can collect such information, optionally protect the information cryptographically, and send it along with the payment message. Once the message reaches the server computer, it can be stored and compared to earlier recorded information about adjacent devices. If the set of those device identifiers have significant overlap with earlier recordings, it can be taken a sign that the paying device is in proximity to devices which it has been close to on previous occasions, and indicate lesser fraud risk. Thus, IPv6 addresses for example, or other identifiers, can play a supplementary role to geolocation Further, data or information that is passed along from node to node in the mesh network can have varying degrees of sensitivity. For example, the data from the initiating device (e.g., device 209), can effect a payment or request a provisioning, and can be protected cryptographically in the same way as if it was carried over a normal communications channel such as telephony (e.g., LTE, 4G etc.). The intermediary nodes acting as conduits may not need to trust the confidentiality or integrity of the data or information.

However, the geo-location information and the IPv6 and other identifier information that originates with the intermediary nodes can have value in informing the risk decision made by the server computer. Thus, this information may warrant extra cryptographic protection to ensure at least its integrity. There may be a few ways to protect the integrity of data from the intermediary nodes. These techniques are exemplary in nature and other techniques may be used.

The first technique may involve no extra protection of data and may simply rely on the security of the transport mechanisms (e.g., BLE). This may provide advantages such as efficiency and low latency. However, an attacker or fraudster may have an easier time compromising the security than if a dedicated protocol were used to protect the integrity of data from the intermediary nodes.

The second technique may involve the use of symmetric key cryptography to protect the data. For example, each node may share a unique symmetric message authentication code (MAC) key with the node ultimately receiving the message (e.g. the server computer). Hence, for nodes A, B, and C, with node Z the ultimately receiving node, the following MAC keys may be assigned respectively: K_AZ, K_BZ, and K_CZ. Each node in a mesh transmission may take as input the data (such as date and time, geo-location and IPv6 and other information) from the previous node (if any), add explicit information about its own identity and the identity of the next receiving node as well as any other information about its own geo-location or proximate other devices, and produce a MAC over the whole payload. This information may then be sent to the next receiving node. Including the identities of the sending and receiving nodes can prevent an intermediate node (e.g., node 3) from excluding the data from a previous node (e.g., node 2) in its message to a subsequent node (e.g., node 4), such that previous intermediate nodes do not appear at all (e.g., node 3 would attempt to send a message to node 4 that appeared to reflect the trace, node 1, 3, and 4, excluding node 2 and all its data). This can be important if the intermediate node is being operated by a fraudster and the previous node provides the true geolocation, whereas node 3 attempts to alter the actual geolocation.

The third technique may involve the use asymmetric key cryptography to protect the information. Each node may have a public key pair, i.e., a public key, certified by the node ultimately receiving the message (e.g. the server computer), and a private signing key. Instead of producing a MAC as in the second technique above, the node can produce a signature over the same data. A difference between the second and third technique is that in the second technique, the ultimate receiving node can validate the MACs, whereas in the third technique the signature can be validated by any intermediary node as well.

Figure 3:
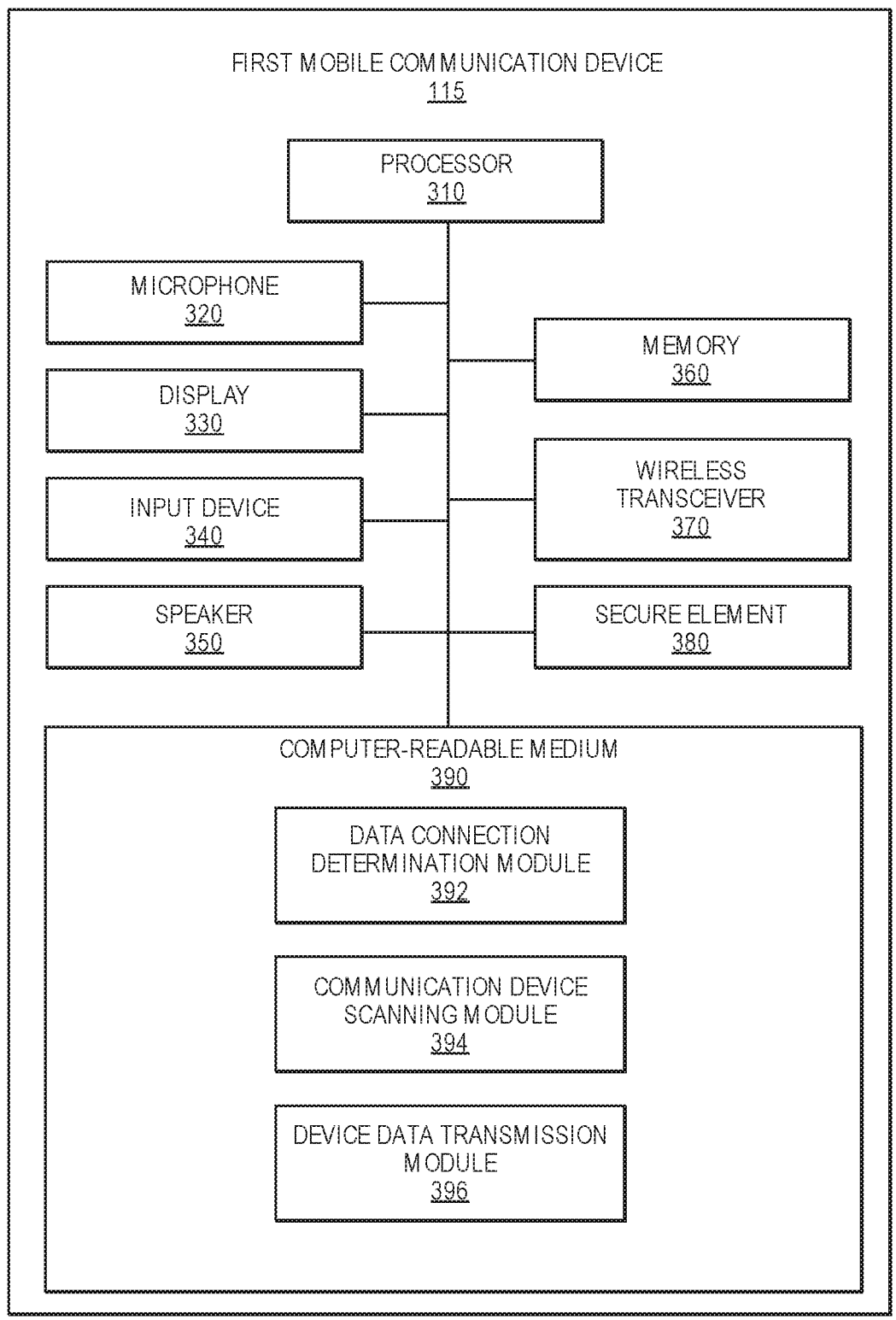
FIG. 3 shows a block diagram of a mobile communication device, according to embodiments of the invention.

FIG. 3 shows a block diagram of a first mobile communication device 115, according to embodiments of the invention. First mobile communication device 115 includes a processor 310, a microphone 320, a display 330, an input device 340, a speaker 350, a memory 360, wireless transceiver 370, secure element 380, and a computer-readable medium 390.

Processor 310 may be any general-purpose processor operable to carry out instructions on the first mobile communication device 115. The processor 310 is coupled to other units of the first mobile communication device 115 including microphone 320, display 330, input device 340, speaker 350, memory 360, wireless transceiver 370, secure element 380, and computer-readable medium 390.

Microphone 320 may be any device that converts sound to an electric signal. In some embodiments, microphone 320 may be used to capture voice data from a user.

Display 330 may be any device that displays information to a user. Examples may include an LCD screen, CRT monitor, or seven-segment display.

Input device 340 may be any device that accepts input from a user. Examples may include a keyboard, keypad, or mouse. In some embodiments, microphone 320 may be considered an input device 340.

Speaker 350 may be any device that outputs sound to a user. Examples may include a built-in speaker or any other device that produces sound in response to an electrical audio signal. In some embodiments, speaker 350 may be used to request voice authentication from a user.

Memory 360 may be any magnetic, electronic, or optical memory. An example of memory 360 may be dynamic random access memory (DRAM).

Wireless transceiver 370 may be operable to transmit and receive a wireless data via an antenna. The wireless transceiver 370 may be transmit and receive data via a wireless network. In some embodiments, the wireless network may be any wireless network such as, but not limited to, the Internet, WiFi, Bluetooth, IR, ZigBee, a Personal Access Network (PAN), or a cellular network (e.g. a GSM, WCDMA, LTE, CDMA2000 network).

Secure element 380 can be a secure memory and execution environment. The secure element 380 may be a dynamic environment in which application code and application data can be securely stored and administered and in which secure execution of applications occur. The secure element 380 may reside in highly secure crypto chip (e.g., a smart card chip). The secure element 380 could be implemented either by a separate secure smart card chip, in the Subscriber Identity Module/Universal Integrated Circuit Card (SIM/UICC) (which is used by GSM mobile phone operators to authenticate subscribers on their networks and maintain personalized subscriber information and applications), or in an SD card that can be inserted in the first mobile communication device 115. In some embodiments, a token may be stored within the secure element 380.

Computer-readable medium 390 may be any magnetic, electronic, optical, or other computer-readable storage medium. Computer-readable medium 390 includes data connection determination module 392, communication device scanning module 394, and device data transmission module 396. Computer-readable medium 390 may comprise any combination of volatile and/or non-volatile memory such as, for example, buffer memory, RAM, DRAM, ROM, flash, or any other suitable memory device, alone or in combination with other data storage devices.

Data connection determination module 392 is configured to, when executed by processor 310, determine whether the first mobile communication device 115 has an active network or data connection. The data connection determination module 392 may make this determination prior to execution of an application or at a predetermined time interval. In some embodiments, data connection determination module 392 may make this determination by sending a "ping" request to a server and waiting for a response. If the response is received, the data connection determination module 392 may determine that an active network or data connection exists, otherwise if the response is not received within a predetermined time period (e.g., the "ping" times out), the data connection determination module 392 may determine that an active network data connection does not exist. The data connection determination module 392 may interface with a transaction application that is being executed by the first mobile communication device 115 and relay information about the data or network connectivity to the transaction application. The same transaction application may be running on other mobile communication devices.

Communication device scanning module 394 is configured to, when executed by processor 310, scan for other communication devices within a proximity of the first mobile communication device 115. Communication device scanning module 394 may scan for the other communication devices by interfacing with wireless transceiver 370. By scanning for the other communication devices, the communication device scanning module 394 can determine which other communication devices are within a proximity of the first mobile communication device 115. The scanning may be done using a communication protocol, e.g., Bluetooth or IR). Additionally, the communication device scanning module 394 may interface with the data connection determination module 392. For example, when the data connection determination module 392 determines that the first mobile communication device 115 does not have an active data or network connection, the communication device scanning module 394 may receive a signal from the data connection determination module 392 indicating such. As a result of receiving the signal, the communication device scanning module 394 may begin scanning for other communication devices. In some embodiments, the communication device scanning module 394 may begin scanning for other communication devices upon the first mobile communication device 115 entering a resource provider store or location. The communication device scanning module 394 may also determine which of the discovered other mobile communication devices have an active network or data connection. This may be accomplished because each mobile communication device (including the first mobile communication device 115) may run the same software application that provides information to other mobile communication devices about its own network or data connectivity.

Device data transmission module 396 is configured to, when executed by processor 310, transmit data from the first mobile communication device 115 to either a server computer or other communication device. The device data transmission module 396 may interface with the wireless transceiver 370 to transmit the data. The device data may include geolocation data, payment data, credential data, device specific identifiers, signal strength, IP address, etc. For example, when the first mobile communication device 115 does not have an active network or data connection, the device data transmission module 396 may transmit device data to another mobile communication device determined by the communication device scanning module 394. The device data transmission module 396 may also establish the data connection between the first mobile communication device 115 and the server computer or other communication device. The data connection may be established by the device data transmission module 396 interfacing with an application running on the mobile communication device 115. This same application may be running on other mobile communication devices as well.

Figure 4:
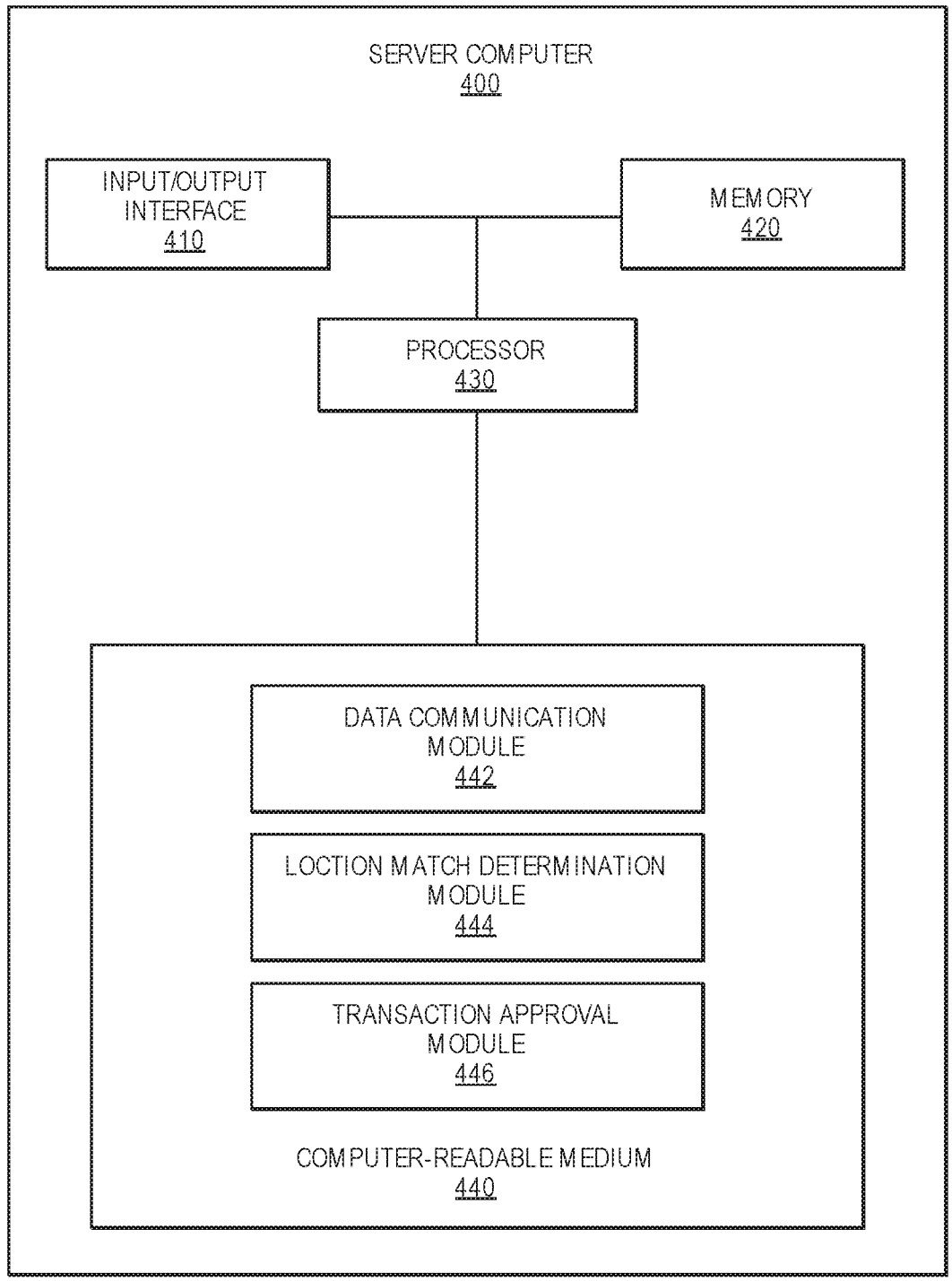
FIG. 4 shows a block diagram of a server computer, according to embodiments of the invention.

FIG. 4 shows a block diagram of a server computer 400, according to embodiments of the invention. Server computer 400 includes an input/output interface 410, a memory 420, a processor 430, and a computer-readable medium 440.

The input/output (I/O) interface 410 is configured to receive and transmit data. For example, the I/O interface 410 may receive the device data from the first mobile communication device 115, via one or more intermediary other mobile communication devices. The I/O interface 410 may also receive transaction data from the access device 150 when the user interacts with the access device 150 using his/her portable device. The I/O interface 410 may also be used for direct interaction with the server computer. The I/O interface 410 may accept input from an input device such as, but not limited to, a keyboard, keypad, or mouse. Further, the I/O interface 410 may display output on a display device.

Memory 420 may be any magnetic, electronic, or optical memory. It can be appreciated that memory 420 may include any number of memory modules, that may comprise any suitable volatile or non-volatile memory devices. An example of memory 420 may be dynamic random access memory (DRAM).

Processor 430 may be any general-purpose processor operable to carry out instructions on the server computer 400. The processor 430 is coupled to other units of the server computer 400 including input/output interface 410, memory 420, and computer-readable medium 440.

Computer-readable medium 440 may be any magnetic, electronic, optical, or other computer-readable storage medium. Computer-readable medium 440 includes data communication module 442, location match determination module 444, and transaction approval module 446. Computer-readable medium 440 may comprise any combination of volatile and/or non-volatile memory such as, for example, buffer memory, RAM, DRAM, ROM, flash, or any other suitable memory device, alone or in combination with other data storage devices. With data communication module 442, location match determination module 444, and transaction approval module 446, and other modules, computer-readable medium 440 can be configured to facilitate the steps of:

a) receiving, by a server computer from an access device at geographic location, an authorization request message comprising transaction data for a transaction conducted by a user using a portable device operating a first mobile communication device; b) receiving, by the server computer, first mobile communication device data from the first mobile communication device via a second mobile communication device operated by a second user at the geographic location; c) determining, by the server computer, first location data of the mobile communication device using the first mobile communication device data; d) determining, by the server computer, second location data from the transaction data in the authorization request message; e) determining, by the server computer, if the first location data and the second location data are within a predetermined distance; and f) allowing, by the server computer, the transaction to proceed when the first location data and the second location data are within the predetermined distance.

Data communication module 442 is configured to, when executed by processor 430, receive device data from the first mobile communication device 115 via one or more other communication devices (e.g., when the first mobile communication device 115 does not have an active network or data connection). Data communication module 442 is also configured to, when executed by processor 430, receive transaction data from the access device 150 when the user interacts with the access device 150 using his/her portable device. The data communication module 442 may interface with the I/O interface 410 in order to receive the device data and/or transaction data. In some embodiments, the received device data and transaction data may each include location data pertaining to the first mobile communication device 115.

Location match determination module 444 is configured to, when executed by processor 430, determine whether location data within the received device data (via data communication module 442) and location data within the received transaction data (via data communication module 442) match. For example, the received transaction data may include location data that identifies a geolocation of the access device 150. The received device data (e.g., received via a mesh network comprising one or more other mobile communication devices) may include location data that identifies a geolocation of the first mobile communication device 115 or one or more other mobile communication devices within a proximity of the first mobile communication device 115. The location match determination module 444 may determine whether the location data identifying the location of the access device 150 matches the location data identifying the location of the first mobile communication device 115. In some embodiments, the identified location of the access device 150 and first mobile communication device 115 need not match exactly, and the location match determination module 444 may still consider a location "match" where both devices are determined to be within a close proximity or predetermined distance to each other. For example, the location match determination module 444 may consider a location "match" where the first mobile communication device 115 and the access device 150 are determined to be within 50 feet of each other. Upon determining whether the two locations match, the location match determination module 444 may output the result to the transaction approval module 446.

In some embodiments, the server computer may also comprise a normalization module to normalize location data so that the location match determine module 444 can perform a matching process. For example, normalization module and the processor could take data such as a merchant ID from an authorization request message transmitted from the access device 150. It may then perform a lookup of that merchant ID to determine the location data for that merchant (e.g., a latitude and longitude for that merchant ID). In another example, the normalization module and the processor may obtain data such as an IP address, signal strength and/or cell tower data, or even location data from a mobile device. This data may then be converted to a common data format (e.g., latitude and longitude) to conduct a location comparison.

The transaction approval module 446 is configured to, when executed by processor 430, approve or deny the transaction initiated by the user (via his/her portable device) at the access device 150 based at least in part on the result output by the location match determination module 444. If the location match determination module 444 outputs a result indicating a location match between the access device 150 and the first mobile communication device 115, the transaction approval module 446 may approve the transaction and transmit an authorization response message indicating such to the access device 150. On the other hand, if the location match determination module 444 outputs a result indicating no location match between the access device 150 and the first mobile communication device 115, the transaction approval module 446 may deny the transaction and transmit an authorization response message indicating such to the access device 150. In other embodiments, the approval process conducted by the transaction approval module 446 and the processor may be temporary in nature. For example, if the transaction approval module 446 and the processor determine that the transaction is approved, it may forward the authorization request message to a downstream issuer computer with an indicator that the server computer 400 preliminarily approved of the transaction. It may then receive an authorization response message with the issuer's decision on the transaction.

Figure 5:
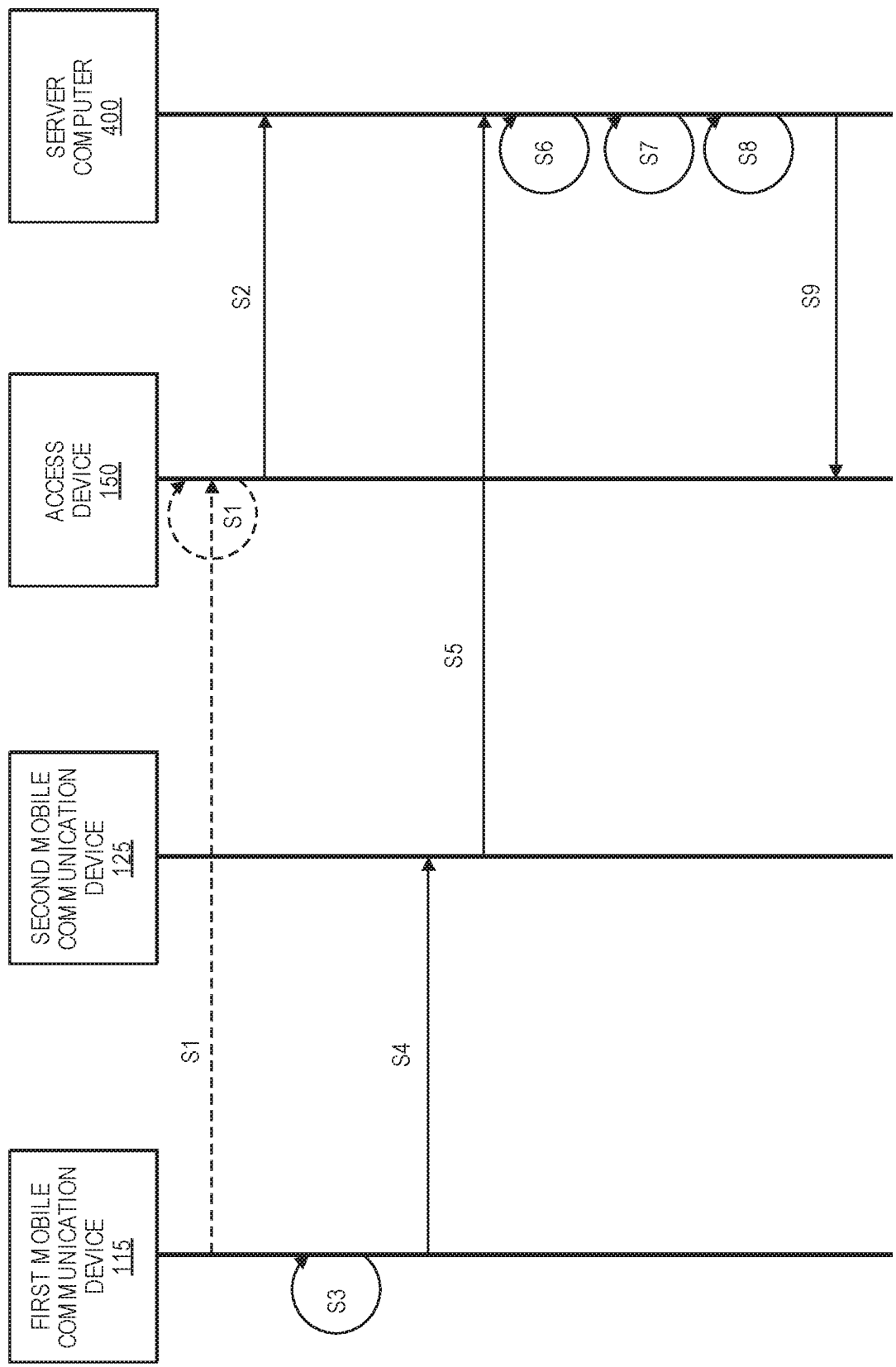
FIG. 5 shows a flow diagram illustrating a method for determining a location of a communication device not having an active data connection, according to embodiments of the invention.

FIG. 5 shows a flow diagram illustrating a method for determining a location of a communication device not having an active data connection, according to embodiments of the invention. At step s1, a user may interact with the access device 150 using his/her portable device in order to initiate a transaction. For example, a user may swipe his/her credit card at the access device 150 after bringing a number of items to a checkout line within the resource provider store 160. In another example, the user may use the first mobile communication device 115 to initiate a transaction with the access device 150 by using a close-range wireless link such as Bluetooth, IR, or NFC.

At step s2, after the user initiates the transaction with the access device 150, the access device 150 may transmit transaction data to the server computer 400. The transaction data may include, but is not limited to, a primary account number (PAN), expiration data, CVV2, address, ZIP code, phone number, and location data indicative of the location of the access device 150.

At step s3, before, after, or simultaneous to the access device 150 transmitting transaction data to the server computer 400, the first mobile communication device 115 may determine whether it has an active data or network connection. As described above, the first mobile communication device 115 may make this determination via data connection determination module 392. For example, the data connection determination module 392 may transmit a "ping" request to the server computer 400, another third-party computer, or a cell tower. The data connection determination module 392 may wait for a predetermined period of time to receive a response to the "ping" request and if no response is received within the predetermined period of time, the data connection determination module 392 may determine that an active network or data connection does not exist. If the first mobile communication device 115 determines that it has an active network or data connection, the transaction may proceed normally. However, if the first mobile communication device 115 determines that it does not have an active network or data connection, the method may proceed to step s4. In some embodiments, the first mobile communication device 115 may periodically make the determination whether or not it has an active network data connection.

At step s4, after the first mobile communication device 115 determines that it does not have an active network or data connection, the first mobile communication device 115 may establish a connection with and transmit device data to a second mobile communication device 125. The second mobile communication device 125 may be discovered by the first mobile communication device 115 via communication device scanning module 394, as described above. Further, the connection between the first mobile communication device 115 and the second mobile communication device 125 may be established via communication device scanning module 394, as described above. The device data can include, but is not limited to, geolocation data, payment data, credential data, device specific identifiers, signal strength, IP address, etc. It may include any suitable data that can be used to determine a location of a device. The second mobile communication device 125 may be a device determined, by the communication device scanning module 394, to have an active network or data connection. In some implementations, the first mobile communication device 115 may know to transmit the device data to the second mobile communication device 125 based on a signal received from the access device 150. For example, the first mobile communication device 115 may receive a Bluetooth, IR, RF, or ZigBee signal from the access device 150.

In some embodiments, step s4 may be performed prior to step s1. For example, in some implementations the first mobile communication device 115 may regularly be responsible for periodically transmitting device data to the server computer 400. The first mobile communication device 115 may transmit the device data directly to the server computer 400 when it normally has an active data or network connection. However, in the case where the first mobile communication device 115 does not have an active network or data connection, upon the next transmission period the first mobile communication device 115 may establish a connection with and transmit device data to the second mobile communication device 125. This "periodic" location may be stored in a database by the server computer 400. The database may be a part of the server computer 400 or may be located within another server computer or third-party computer. Additionally, the server computer 400 may retrieve any previously stored locations in the database as an additional "check" to ensure that the location of the first mobile communication device 115 is not being spoofed. For example, when the server computer 400 receives the "periodic" device data from the first mobile communication device 115, the server computer 400 may store location data derived from the received device data (and other data derived from the device data) in the database. At the time of the transaction, the server computer may retrieve the previously stored location data (and other data) from the database and compare the received location data and other data to the data stored in the database. Approval of the transaction may be based on this comparison, in addition to the comparison described with respect to step s8, below.

At step s5, after the first mobile communication device 115 establishes a connection with and transmits device data to the second mobile communication device 125, the second mobile communication device 125 may forward the received device data to the server computer 400. By acting as a "conduit," the second mobile communication device 125 may provide network or data connectivity for the first mobile communication device 115 such that the device data can reach its destination (e.g., server computer 400).

At step s6, after the second mobile communication device 125 forwards the received device data to the server computer 400, the server computer 400 may determine first location data pertaining to the first mobile communication device 115 based on the received device data (e.g., from the first mobile communication device 115 via the mesh network including the second mobile communication device 125). The location data may be determined from the received device data directly. For example, the received device data may include longitude and latitude coordinates of the first mobile communication device 115. In other embodiments, the location data may be determined indirectly. For example, the server computer 400 may receive an IP address associated with the first and/or second mobile communication devices 115, 125, and may determine approximate an approximate latitude and longitude for the first and second mobile communication devices 115, 125.

At step s7, after the server computer 400 determines the first location data pertaining to the first mobile communication device 115, the server computer 400 may determine second location data from the transaction data received from the access device 150, in step s2. The location data may be determined from the received transaction data directly. For example, the received transaction data may include longitude and latitude coordinates of the access device 150 that is within the resource provider store 160. In other embodiments of the invention, the location data may be determined indirectly. For example, a merchant ID may be present in the transaction data, and this merchant ID may correlate to a latitude and longitude of the merchant associated with the merchant ID.

At step s8, after the server computer 400 determines the first location data in step s6 and the second location data in step s7, the server computer 400 may determine whether the first location data and the second location data match. This may be accomplished via the location match determination module 444, described above.

At step s9, after the server computer 400 determines whether the first location data and the second location data match, the server computer 400 may approve or deny the transaction based on the match determination. The server computer 400 may relay the result of the approval or denial to the access device 150.

In other embodiments of the invention, the server computer 400 may make an initial authorization determination based upon whether or not the first and second location data match. Instead of replying to the received authorization request message with an authorization response message, it may forward the authorization request message to an issuer computer (not shown in FIG. 5) for a final authorization determination. The forwarded authorization request message may include an indicator that can inform the issuer computer that the first and second location data match. The issuer may then use this information to determine if the transaction is ultimately authorized. After the issuer computer has made an authorization decision, it may reply with an authorization response message which may be received by the server computer 400. The server computer may then send the authorization response message back to the access device 150.

Figure 6:
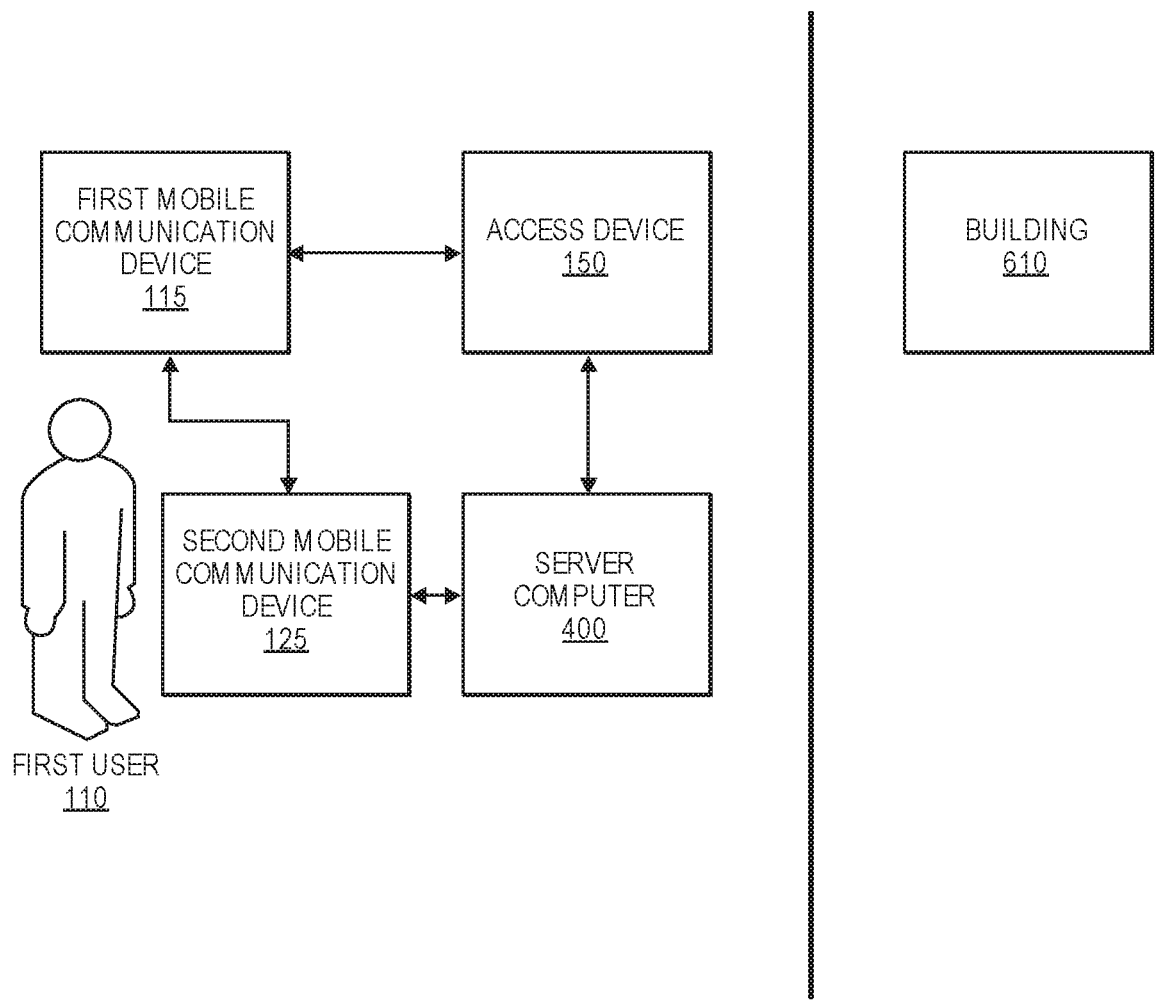
FIG. 6 shows a block diagram of a building access system, according to embodiments of the invention.
Figure 7:
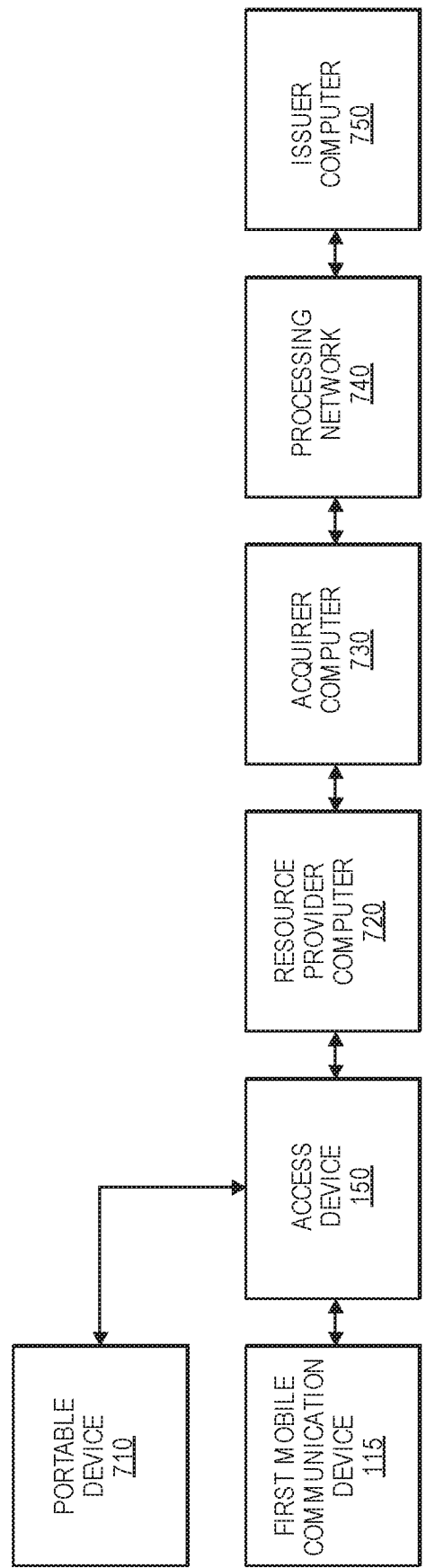
FIG. 7 shows a block diagram of a transaction processing system, according to embodiments of the invention.

The above described process is not limited to transactions and payments and can be used in many other contexts. For example, the above described process can be used to access a building, where access to the building relies on credential data or access data stored in the mobile communication device not having an active network or data connection. FIG. 6 illustrates a system including a mobile device that is provisioned with credential data access data and that can allow a user to access a location such as a building. FIG. 7 illustrates a payment processing system that includes a mobile device that is provisioned with access data and that allows a user to access an account to pay for a good or service at a merchant.

FIG. 6 shows a block diagram of a building access system. FIG. 6 shows a first mobile communication device 115 operated by a first user 110. The first mobile communication device 115 has been provisioned with access data as described above. The first mobile communication device 115 can interact with the access device 150 and pass access device transaction data to the access device 150. The access device 150 may then pass the access device transaction data to a remote server computer 400. The second location data of the access device 150 can be determined as explained above. Before, during, or after receiving the access data from the access device 150, the server computer 400 may receive first mobile communication device data from the first mobile communication device 115 via the second mobile communication device 125. The first and second mobile communication devices 115, 125 may form part of a mesh network. The server computer 400 may determine from the first mobile communication device data, first location data, and may then compare the first and second location data to confirm that the first user 110 is authentic. After the remotely located server computer 400 determines that the first user 110 is authentic, it may transmit a signal indicating this back to the access device 150. The access device 150 may then proceed to let the first user 110 enter the building 610.

FIG. 7 shows a block diagram of a transaction processing system, according to embodiments of the invention. A user may use the first mobile communication device 115 or the portable device 710 to pay for a good or service at a resource provider. The resource provider may operate a resource provider computer 720 and/or an access device 150. The resource provider may communicate with an issuer computer 750 via an acquirer computer 730 and a processing network 740. The system illustrated in FIG. 7 can be used with the methods, systems, and computers described and shown previously.

The processing network 740 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow using a first mobile communication device 115 at an access device 150 (e.g. POS location) can be described as follows. A user presents his or her first mobile communication device 115 to an access device 150 to pay for an item or service. The first mobile communication device 115 and the access device 150 interact such that access data from the first mobile communication device 115 (e.g. PAN, a payment token, verification value(s), expiration date, etc.) is received by the access device 150 (e.g. via contact or contactless interface). The resource provider computer 720 may then receive this information from the access device 150 via an external communication interface. The resource provider computer 720 may then generate an authorization request message that includes the information received from the access device 150 (i.e. information corresponding to the first mobile communication device 115) along with additional transaction information (e.g. a transaction amount, merchant specific information, etc.) and electronically transmits this information to an acquirer computer 730. The acquirer computer 730 may then receive, process, and forward the authorization request message to a processing network 740 for authorization.

In general, prior to the occurrence of a credit or debit-card transaction, the processing network 740 has an established protocol with each issuer on how the issuer's transactions are to be authorized. In some cases, such as when the transaction amount is below a threshold value, the processing network 740 may be configured to authorize the transaction based on information that it has about the user's account without generating and transmitting an authorization request message to the issuer computer 750. In other cases, such as when the transaction amount is above a threshold value, the processing network 740 may receive the authorization request message, determine the issuer associated with the first mobile communication device 115, and forward the authorization request message for the transaction to the issuer computer 750 for verification and authorization. Once the transaction is authorized, the issuer computer 750 may generate an authorization response message (that may include an authorization code indicating the transaction is approved or declined) and transmit this electronic message via its external communication interface to processing network 740. The processing network 740 may then forward the authorization response message to the acquirer computer 730, which in turn may then transmit the electronic message to comprising the authorization indication to the resource provider computer 720, and then to the access device 150.

At the end of the day or at some other suitable time interval, a clearing and settlement process between the resource provider computer 720, the acquirer computer 730, the processing network 740, and the issuer computer 750 may be performed on the transaction.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary

What is claimed is:

1. A method comprising the steps of:
   a) receiving, by a server computer from an access device that a user interacts with to execute a transaction at a geographic location, an authorization request message comprising transaction data for the transaction conducted by the user using a portable device;
   b) receiving, by the server computer, mobile communication device data from a first mobile communication device operated by the user, wherein the first mobile communication device determines that an active data connection or location data is not available upon entering the geographic location, and establishes a connection to a second mobile communication device operated by another user at the geographic location, the second mobile communication device being a part of a mesh network of mobile communication devices that can confirm the geographic location of the first mobile communication device, and wherein the mobile communication device data is provided to the server computer via the mesh network;
   c) determining, by the server computer, first location data of the first mobile communication device using the mobile communication device data;
   d) determining, by the server computer, second location data from the transaction data in the authorization request message;
   e) determining, by the server computer, if the first location data and the second location data are within a predetermined distance; and
   f) allowing, by the server computer, the transaction to proceed when the first location data and the second location data are within the predetermined distance.

2. The method of claim 1, wherein steps b) and c) are performed before step a), and wherein the method further comprises:
   before step a), storing the determined first location data in a database in communication with the server computer; and
   after step a) and before step e) retrieving the determined first location data from the database.

3. The method of claim 1, wherein the first and second mobile communication devices have the same type of mobile application, wherein the first and second mobile communication devices form a short range communication link using the same type of mobile application.

4. The method of claim 3, wherein the short range communication link is a Bluetooth or infrared communication link.

5. The method of claim 1, wherein the mobile communication device data is encrypted.

6. The method of claim 1, wherein the first and second mobile communication devices form the mesh network that employs an ad-hoc routing protocol.

7. The method of claim 1, wherein the mobile communication device data comprises a signal strength of the first mobile communication device, an IP address utilized by the first mobile communication device, or the first location data.

8. The method of claim 1, wherein the geographic location is a resource provider location.

9. The method of claim 1, wherein the second mobile communication device comprises at least one of a smartphone, a router, a smartwatch, or an Internet-of-Things (IoT) appliance.

10. A server computer comprising:
a processor; and
a computer readable medium, the computer readable medium comprising
a) receiving, by a server computer from an access device that a user interacts with to execute a transaction at a geographic location, an authorization request message comprising transaction data for the transaction conducted by the user using a portable device;
b) receiving, by the server computer, mobile communication device data from a first mobile communication device operated by the user, wherein the first mobile communication device determines that an active data connection or location data is not available upon entering the geographic location, and establishes a connection to a second mobile communication device operated by another user at the geographic location, the second mobile communication device being a part of a mesh network of mobile communication devices that can confirm the geographic location of the first mobile communication device, and wherein the mobile communication device data is provided to the server computer via the mesh network;
c) determining, by the server computer, first location data of the first mobile communication device using the mobile communication device data;
d) determining, by the server computer, second location data from the transaction data in the authorization request message;
e) determining, by the server computer, if the first location data and the second location data are within a predetermined distance; and
f) allowing, by the server computer, the transaction to proceed when the first location data and the second location data are within the predetermined distance.

11. The server computer of claim 10, wherein steps b) and c) are performed before step a), and wherein the method further comprises:
before step a), storing the determined first location data in a database in communication with the server computer; and
after step a) and before step e) retrieving the determined first location data from the database.

12. The server computer of claim 10, wherein the first and second mobile communication devices have the same type of mobile application, wherein the first and second mobile communication devices form a short range communication link.

13. The server computer of claim 12, wherein the short range communication link is a Bluetooth or infrared communication link.

14. The server computer of claim 10, wherein the mobile communication device data is encrypted.

15. The server computer of claim 10, wherein the first mobile communication device data comprises a signal strength of the first mobile communication device, an IP address utilized by the first mobile communication device, or the first location data.

16. A method comprising:
a) transmitting, by a first mobile communication device operated by a first user, mobile communication device data to a remote server computer via a second mobile communication device operated by a second user, wherein the remote server computer (i) receives from an access device that the first user interacts with to execute a transaction at a geographic location, an authorization request message comprising transaction data for the transaction conducted by the first user using a portable device, (ii) receives the mobile communication device data from the first mobile communication device, wherein the first mobile communication device determines that an active data connection or location data is not available upon entering the geographic location, and establishes a connection to the second mobile communication device operated by the second user at the geographic location, the second mobile communication device being a part of a mesh network of mobile communication devices that can confirm the geographic location of the first mobile communication device, and wherein the mobile communication device data is provided to the server computer via the mesh network, (iii) determines first location data of the first mobile communication device using the mobile communication device data, (iv) determines second location data from the transaction data in the authorization request message, (v) determines if the first location data and the second location data are within a predetermined distance; (vi) allows the transaction to proceed when the first location data and the second location data are within the predetermined distance; and
b) receiving, by the first mobile communication device, a transaction alert message from the server computer indicating that the transaction was authorized.

17. The method of claim 16, wherein the first mobile communication device is a first mobile phone and the second mobile communication device is a second mobile phone.

18. The method of claim 16, wherein the first and second mobile communication devices have the same type of mobile application, wherein the first and second mobile communication devices form a short range communication link using the same type of mobile application.

19. A mobile phone comprising a processor and a computer readable medium, the computer readable medium comprising code, executable by the processor, for implementing the method of claim 16.

20. The mobile phone of claim 19, wherein the mobile phone forms a short range communication link with a second mobile phone, via a mobile application executing on both the first mobile phone and the second mobile phone.

* * * * *